C. V. WRIGHT.
SHAKING SCREEN.
APPLICATION FILED NOV. 7, 1919.
1,344,747.
Patented June 29, 1920.
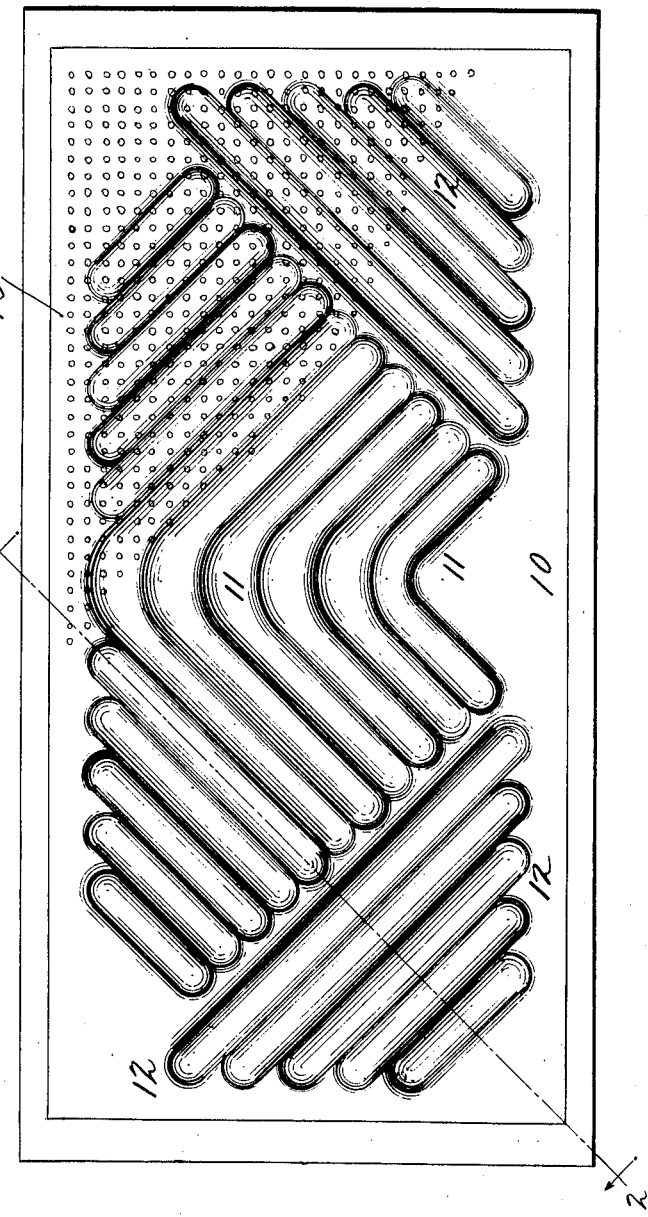
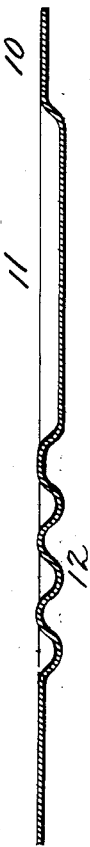
Inventor
Chas. V. Wright,
by Chas. J. Williamson
Atty.

UNITED STATES PATENT OFFICE.

CHARLES V. WRIGHT, OF REYNOLDS, PENNSYLVANIA.

SHAKING-SCREEN.

1,344,747. Specification of Letters Patent. Patented June 29, 1920.

Application filed November 7, 1919. Serial No. 336,353.

*To all whom it may concern:*

Be it known that I, CHARLES V. WRIGHT, of Reynolds, in the county of Schuylkill, State of Pennsylvania, have invented a certain new and useful Improvement in Shaking-Screens, and do hereby declare that the following is a full, clear, and exact description thereof.

My invention relates to the plates of shaker screens for washing coal and ores, and generally stated, the object of my invention is to provide a construction which will effect the desired agitation of the material and assure its distribution uniformly over the plate, preventing banking of the material at the sides, and possesses great rigidity and to this end and for the attainment of other objects, which will be evident to those skilled in the art, from the detailed description hereinafter given, my invention consists in the shaker plate having the characteristics of construction substantially as hereinafter specified and defined by or included within the claims.

In the accompanying drawings is illustrated a preferred embodiment of my invention, in which drawings—

Figure 1 is a top plan view of a shaker plate embodying my invention; and

Fig. 2 is a section on the line 2—2 of Fig. 1.

My invention has to do with that type of shaker plate having riffles on its surface and perforated for the passage from the plate of fine material. A series of such plates, oblong in form, are placed edge to edge to extend over the desired area, and are supported, as usual, by a suitable framing in a box. I consider it necessary to illustrate my invention to show in the drawings merely one plate, since my invention has to do only with the configuration of the surfaces over which the material passes and has nothing to do with the manner of mounting, or supporting the plates. The plate 10 shown in the drawings, is oblong in form, its longer dimension being crosswise of the direction of travel of the material. As shown in the drawings there are three groups of riffles, a central one 11, (roughly speaking) and two side groups 12. The central group consists of riffles that are symmetrically arranged on opposite sides of the median line of the plate transversely, extending, on opposite sides of such line, outward and downward (speaking with reference to the direction of flow of material), and parallel and contiguous with one another, the lowermost ones meeting and joining at such median line, and all preferably terminating on a straight line that runs downwardly and inwardly, and spaced from the first one of one of the side groups 12, the riffles of which extend preferably parallel with such straight terminal line. The riffles of each side group 12 are parallel, and contiguous and terminate at their lower ends in a straight line crosswise of the plate and at their upper ends in a straight line downward of the plate. The side groups 12 occupy the lower side corners of the plate.

The riffles are formed by corrugating the plate so that they present alternating concavo-convexly curved ribs on the material-engaging side of the plate.

It will be evident that the riffles of the central group will cause an outward flow of the material from the median line in opposite directions, while the side groups 12, will intercept it as it passes from the central group and direct it inward, the net result of this action being the uniform spreading of material, a lively movement of the same, and the avoidance of banking, for tendency to bodily sidewise movement of masses of material is prevented. Since there is no tendency of the material to bodily movement to either side of the plate with resulting banking, or accumulation thereat, it is not necessary to provide any special means, as by a particular formation of a succeeding plate, to counteract that tendency, and, hence, all the plates, where my invention is employed, may be alike,—an obviously important advantage from both the manufacturer's and user's standpoint.

And the grouping and arrangement of the riffles, which secured the very desirable actions I have described, at the same time give stiffness and rigidity to the plate, preventing sagging and prolonging its life. Thus the central portion of the plate, where the greatest bending strain naturally comes, is stiffened and prevented from sagging by the junction of the ribs at the median line, and their oblique direction; and the obliquity of direction of the riffles of the side group, which direction is crosswise of the direction of the contiguous half of the riffles of the center group, stiffens the plate against any tendency it might have to buckle or bend along lines parallel with the riffles of the center group.

I, of course, do not limit myself to the particular angles of the riffles shown or to other matters of construction which may be changed without involving departure from the principle of my invention as set forth in the claims.

I claim:

1. A shaker plate having a group of oppositely diverging riffles and a group of riffles that extend crosswise of each set of riffles of the first group.

2. A shaker plate having a group of oppositely diverging riffles and a group of riffles that extend crosswise of each set of riffles of the first group, the first group being central of the plate and each of the other groups in one of the lower corners of the plate.

3. A shaker plate having a group of oppositely diverging riffles and a group of riffles that extend crosswise of each set of riffles of the first group, the first group being central of the plate and each of the other groups in one of the lower corners of the plate, and riffles of the first group joining at the median line of the plate.

4. A shaker plate having a group of oppositely diverging riffles and a group of riffles that extend crosswise of each set of riffles of the first group, the first group being central of the plate and each of the other groups in one of the lower corners of the plate, the lower ends of the riffles of the first group terminating in a line parallel with the first riffle of the adjacent corner group.

5. A shaker plate having a group of oppositely diverging riffles and a group of riffles that extend crosswise of each set of riffles of the first group, the first group being central of the plate and each of the other groups in one of the lower corners of the plate, the lower ends of the riffles of the first group terminating in a line parallel with the first riffle of the adjacent corner group and the lower ends of the riffles of the corner group terminating in a line parallel with the bottom of the plate.

In testimony that I claim the foregoing I have hereunto set my hand.

CHARLES V. WRIGHT.

Witnesses:
EARL J. WAGNER,
WILLIAM SHUGG.